United States Patent [19]
Jung et al.

[11] Patent Number: 5,206,715
[45] Date of Patent: Apr. 27, 1993

[54] CIRCUIT FOR SEPARATING LUMINANCE AND CHROMINANCE SIGNALS

[75] Inventors: Jun-mo Jung; Jeong-sang Lee, both of Suwon, Rep. of Korea

[73] Assignee: Samsung Electronics Co., Ltd., Suwon, Rep. of Korea

[21] Appl. No.: 641,274

[22] Filed: Jan. 15, 1991

[30] Foreign Application Priority Data

Jun. 9, 1990 [KR] Rep. of Korea .................... 90-8475

[51] Int. Cl.$^5$ ........................ H04N 9/64; H04N 9/77
[52] U.S. Cl. ........................................ 358/31; 358/39
[58] Field of Search ........................... 358/31, 39, 40

[56] References Cited

U.S. PATENT DOCUMENTS

| | | | |
|---|---|---|---|
| 4,703,342 | 10/1987 | Takahashi | 358/31 |
| 4,809,060 | 2/1989 | Saeki | 358/31 |

FOREIGN PATENT DOCUMENTS

| | | | |
|---|---|---|---|
| 59-151592 | 8/1984 | Japan | 358/31 |
| 2116393 | 9/1983 | United Kingdom | 358/31 |

*Primary Examiner*—Michael Razavi
*Assistant Examiner*—Wendy R. Greening
*Attorney, Agent, or Firm*—Robert E. Bushnell

[57] ABSTRACT

A circuit for separating the luminance signal and chrominance signal from a composite video signal in a digital signal processing system using adaptive 2H comb filters. The circuit according to the present invention generates luminance difference signals, and chrominance difference signals from the horizontal scanning lines of a composite video signal for the purpose of detecting the correlation of the chrominance difference signals as well as the correlation of the luminance difference signals to generate a correlation coefficient. The chrominance signal is accurately separated from a composite video signal in response to the generated correlation coefficient.

15 Claims, 6 Drawing Sheets

FIG.2
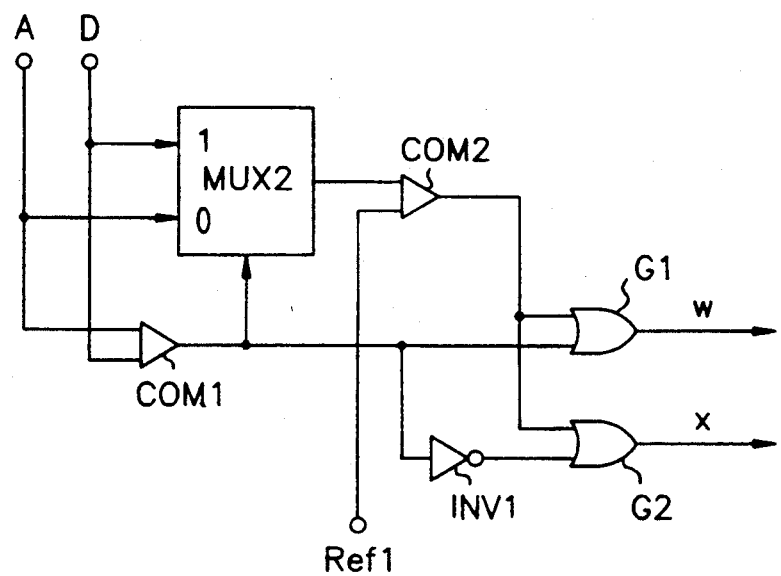
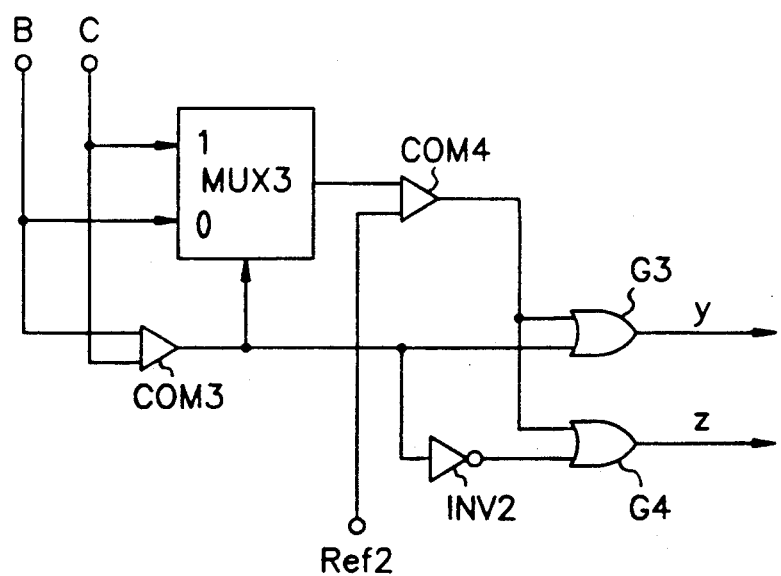

CIRCUIT FOR SEPARATING LUMINANCE AND CHROMINANCE SIGNALS

BACKGROUND OF THE INVENTION

1. Field of the invention

The present invention relates to a circuit for separating luminance and chrominance signals from a composite video signal in a color video processing system, and more particularly to a circuit for separating luminance and chrominance signals using an adaptive 2H comb filters.

Generally, in case of adopting National Television System Committee broadcasting system, using technologies for separating the luminance signal Y and the chrominance signal C from a composite video signal has been proposed in various ways.

Standard color television systems transmit the luminance signal and the chrominance signal separately, and provide luminance signals (Y) that are in phase from horizontal scan line to horizontal scan line and chrominance signals that are 180 degrees out of phase on adjacent horizontal scan lines. At the video level, a composite video signal is established that is Y+C for one horizontal scan line and Y−C for the next horizontal scan line. These sum and difference video signals are utilized to separate the luminance video signal from the chrominance video signal.

Especially, in a motion picture Y/C separation is carried out by using the characteristics between scan lines and in a still picture Y/C separation is carried out by using the frame memory.

The principles of Y/C separation between scan lines which have realized up to now in a motion picture will be described below. The luminance and chrominance signals information of 2 scan lines of FIG. 5 are for example, rely on the contents of the present picture, however between the content of i th line and that of i+1 th line in a motion picture the information of the luminance and chrominance signal may be similar.

If the composite video signal, the luminance and the chrominance signal situated in $\Delta t$ from a reference point of the i-th line are designated as Vi, Yi and Ci, respectively and the corresponding signals in the i+1th line are designated as Vi+1, Yi+1 and Ci+1, respectively, the following equation can be made:

In the $i$-th line;

$$Vi(t + \Delta t) = Y_1(t + \Delta t) + C_1(t + \Delta t) \quad (1)$$
$$= Y_1(t + \Delta t) + E(R - Y)^1 \cos 2\pi f_{sc}(t + \Delta t) +$$
$$E(B - Y)^1 \sin 2\pi f_{sc}(t + \Delta t)$$

In the $i + $ 1th line;

$$Vi + 1\left(t + \Delta t + \frac{1}{fH}\right) = Yi + 1\left(t + \Delta t + \frac{1}{fH}\right) + \quad (2)$$

$$E(R - Y)^1 \cos 2\pi f_{sc}\left(t + \Delta t d + \frac{1}{fH}\right) +$$

$$Y(B - Y)^1 \sin 2\pi f_{sc}\left(t + \Delta t d + \frac{1}{fH}\right)$$

-continued

Substituting $f_{sc} = \frac{425}{2} fH$ into the equation (2) yields $$Yi + 1\left(t + \Delta t + \frac{1}{fH}\right) + \quad (3)$$

$$E(R - Y)^1 \cos 2\pi f_{sc}\left(t + \Delta t + \frac{455}{2f_{sc}}\right) +$$

$$Y(B - Y)^1 \sin 2\pi f_{sc}\left(t + \Delta t + \frac{455}{2f_{sc}}\right) =$$

$$Yi + 1\left(t + \Delta t + \frac{1}{fH}\right) - E(R - Y)^1 \cos 2\pi f_{sc}(t + \Delta t) +$$

$$E(B - Y)\sin 2\pi f_{sc}(t + \Delta td)$$

Therefore, from the equations (1) and (3) we can obtain the following relationships:

$$Vi(t+\Delta t)=Yi(t+\Delta t)+Ci(t+\Delta t)$$

$$Vi_1 (t+\Delta t)=Yi+_1 (t+\Delta t)-Ci(t+\Delta t)$$

Namely, if Yi and Yi+1 are similar and the chrominance information are similar between adjacent 2 scan lines, Y/C separation can be carried out by adding and subtracting Y+C and Y−C as shown in FIG. 4.

Next, referring to FIG. 6 an adaptive 2H comb filtering method more excellent than the above-mentioned Y/C separation method will be described below. When the number of scan lines are 3 as shown in FIG. 7, Y/C separation of line (5) separates Y/C separation adaptively by detecting the correlation between upper and lower lines. Namely, the differences between line (5) and line (4), and between line (5) and line (6) in FIG. 6 are $\Delta Y_L + \Delta Y_H + 2C$, respectively. Here, $\Delta Y_L$ is a luminance low pass component, $\Delta Y_H$ is a luminance high pass component and C is a chrominance signal. If the $\Delta Y_L \Delta Y_H + 2C$ signal passes through low pass filters LPF3 and LPF4, $\Delta Y_L$ is obtained respectively, so that the correlation based on the value of $\Delta Y_L$ is detected. This means that the smaller the difference component is the larger the correlation is and therefore the chrominance signal C is taken by the difference component between lines with smaller difference component. Here, the luminance low pass correlation is small and the chrominance signal correlation is not detected, because $\Delta Y_L$ detected contains only the low pass luminance component.

Further, when there exists no correlation various defects can be caused by carrying out Y/C separation between lines.

SUMMARY OF THE INVENTION

Therefore, it is an object of the present invention to provide a circuit for separating the luminance and chrominance signals from the line having large correlation by detecting correlation of the chrominance signal as well as the correlation of the luminance signal.

It is another object of the present invention to provide a circuit for separating the luminance and chrominance signals which are accurately filtered by outputting a band pass filtered signal when the correlation of the signal between lines is not existed at all.

To accomplish the above objects, there is provided a circuit for separating luminance and chrominance signal according to the present invention, which may be contracted with:

a first delay device for 1H delaying a composite video signal;

a second delay device for 1H delaying the output of the first delay device;

a first subtractor for subtracting the composite video signal on the first delay device;

a first adder 20 for adding the output of the first delay device to the composite video signal;

a second adder 30 for adding the first delay output and the second delay output;

a subtractor 40 for subtracting the second delay output on the first delay output;

a first and a second low pass filter for low pass filtering the outputs of the first and second subtractor, respectively and outputting luminance components;

a second and a third bandpass filter for filtering the outputs of the first and second adder at a predetermined band, respectively and outputting chrominance components;

a correlation detector for detecting correlation from the outputs of four filters and generating first to fourth correlation control signals;

a coefficient generator for logically combining the first to fourth correlation control signals and generating correlation detecting coefficients;

a first bandpass filter for bandpass filtering the output of the first delay device;

a multiplexer for receiving the signals supplied from the first bandpass filter the first subtractor and the second subtractor and outputting one of the received signals selectively with the result of the correlation detection coefficient.

BRIEF DESCRIPTION OF THE DRAWINGS

FIG. 2 is a detail circuit diagram showing the correlation detector of FIG. 1.

DETAIL DESCRIPTION OF THE PREFERRED EMBODIMENTS

Figure 1:
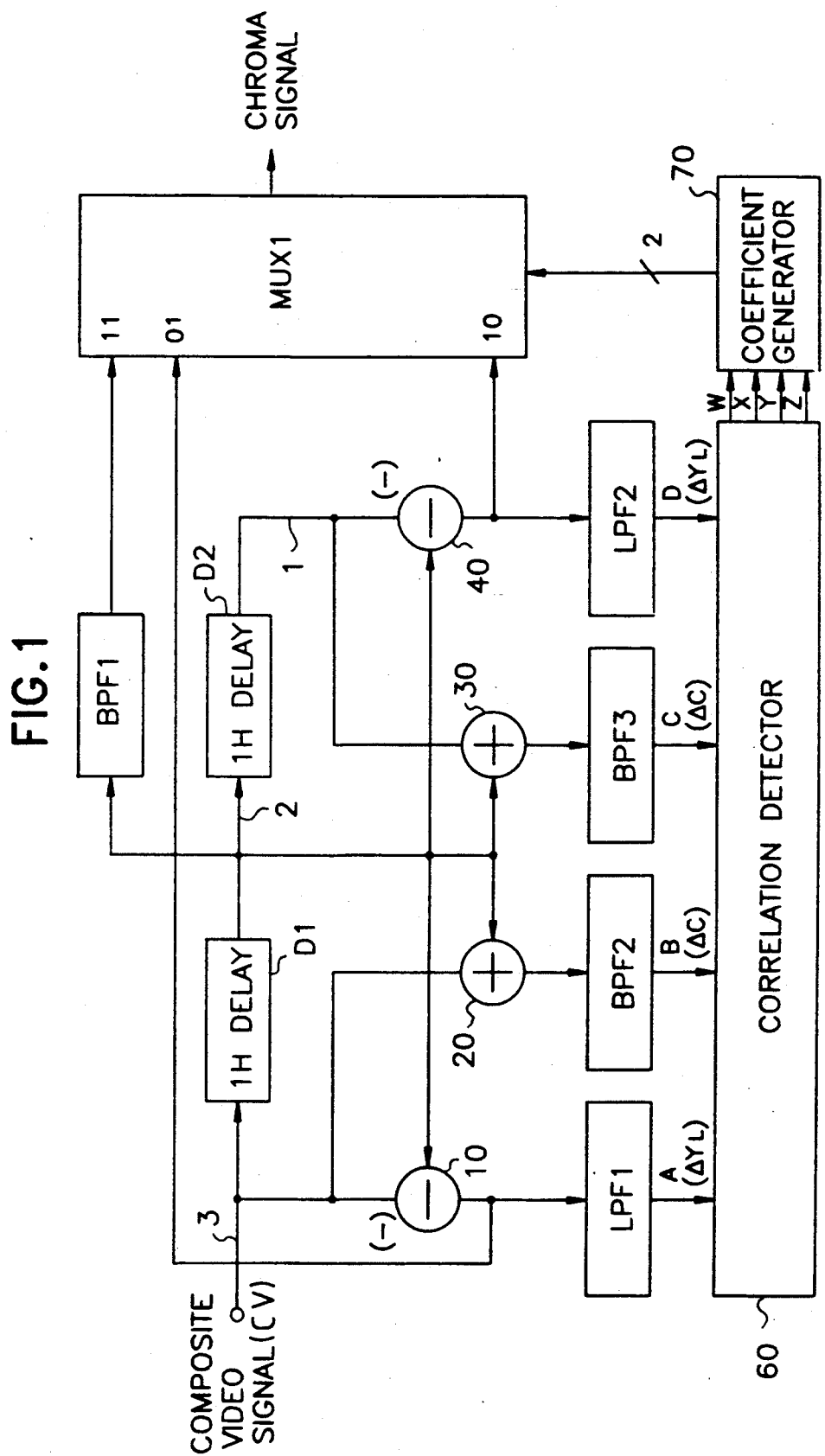
FIG. 1 is a schematic block diagram showing a circuit for separating the luminance and chrominance signals from a composite video signal according to the present invention.

In a circuit for separating the luminance and chrominance signals from a composite video signal according to the present invention, shown in FIG. 1, the composite video signal is delayed by a first delay device D1 for a time interval equal to the time required to complete one horizontal scan line hereinafter 1H. This delayed signal again by a second delay device D2 for 1H time interval. A first subtractor 10 subtracts the composite video signal CV from the output of the first delay device D1. A first adder 20 adds the output of the first delay device D1 to the composite video signal CV. A second adder 30 adds the first delayed output and the second delayed output A separator 40 subtracts the second delayed output from the first delayed output. The first and second low pass filters LPF1 and LPF2 are low pass filtering the outputs of the first and second subtractors 10 and 40 and output the luminance components $\Delta Y_L$; A and D. The second and a third band pass filters BPF2 and BPF3 are filtering the outputs of the first adder 20 and 30 at a predetermined bandwidth, respectively and output the chrominance components $\Delta C$; B and C. A correlation detector 60 detects a correlation from the outputs A, B, C and D of four filters LPF1, BPF1, BPF2 and LPF2 and outputs four correlation control signals w,x,y and z to a coefficient generator 70. The coefficient generator 70 combines the four correlation control signals w,x,y and z logically generates a correlation coefficient. A first band pass filter BPF1 performs to band pass filter the output of the first delay device D1 and supplies the band pass filtered signal to a multiplexer MUX1. This multiplexer MUX1 receives the output signals supplied from the first band pass filter BPF1, the first subtractor 10 and the second subtractor 40 and selectively outputs one of the received signals in accordance with the correlation detecting coefficient.

FIG. 2 shows a detail circuit diagram of the correlation detector 60 shown in FIG. 1.

The correlation detector 60 comprises a first comparator COM1 for comparing the output A of the first low pass filter LPF1 to the output D of the second low pass filter LPF2, a second multiplexer MUX2 for outputting the outputs A and D of the two filter LPF1 and LPF2 selectively under the control of the first comparator COM1; a first comparator COM2 for comparing a predetermined first reference value to the output of the second multiplexer MUX2; a first OR gate G1 for logically summing the outputs of the first and second comparator COM1 and COM2, and outputting a first correlation control signal W; a first inverter INV1 for inverting the output of the first comparator COM1, a second OR gate G2 for logically summing the output of the first inverter INV1 and the output of the second comparator COM2, and outputting the second correlation control signal X; a third comparator COM3 for comparing the output B of the second band pass filter BPF2 to the output C of the third band pass BPF3;

a third multiplexer MUX3 for outputting the output of the two filters BPF2 and BPF3 under the control of the output of the third comparator COM3;

a fourth comparator COM4 for comparing a predetermined second reference value to the output of the third multiplexer MUX3;

a third OR gate G3 for logically summing the output of the third and fourth comparator COM3 and COM4, and outputting the third correlation control signal Y;

a second inverter INV2 for inverting the output of the third comparator COM3;

a fourth OR gate G4 for logically summing the output of the second inverter INV2 and the output of the fourth comparator COM4, and outputting the fourth correlation control signal Z.

Figure 3:
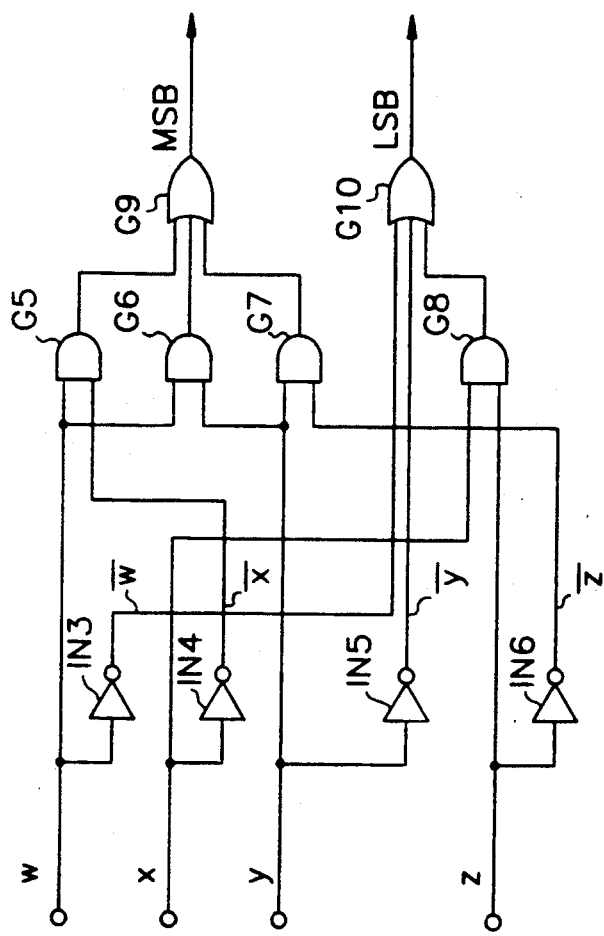
FIG. 3 is a detail circuit diagram showing the coefficient generator of FIG. 1.
Figure 5:
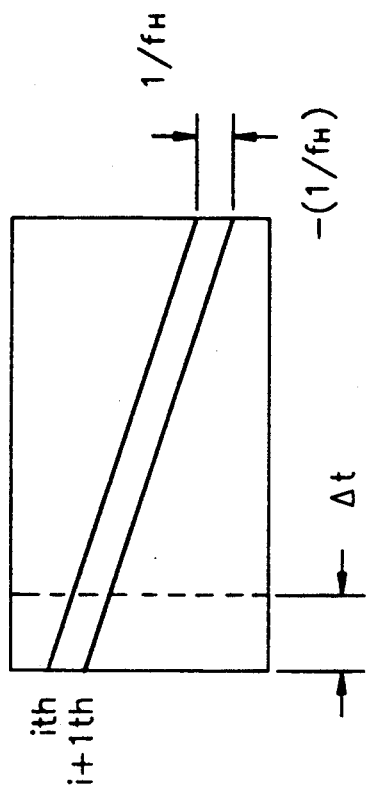
FIG. 5 and FIG. 7 are sketches showing an arrangement of the scanning lines in the display.
Figure 4:
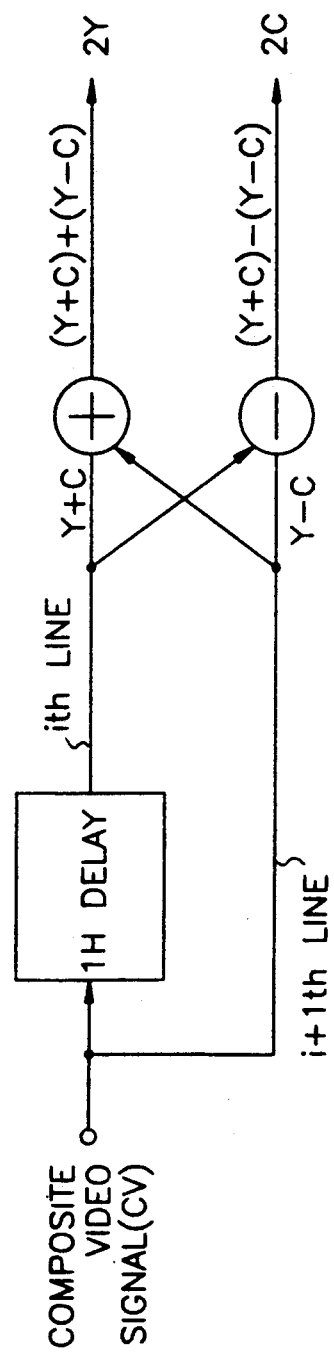
FIG. 4 is an illustrated block diagram for explaining the Y/C separation between the lines in the prior art.
Figure 6:
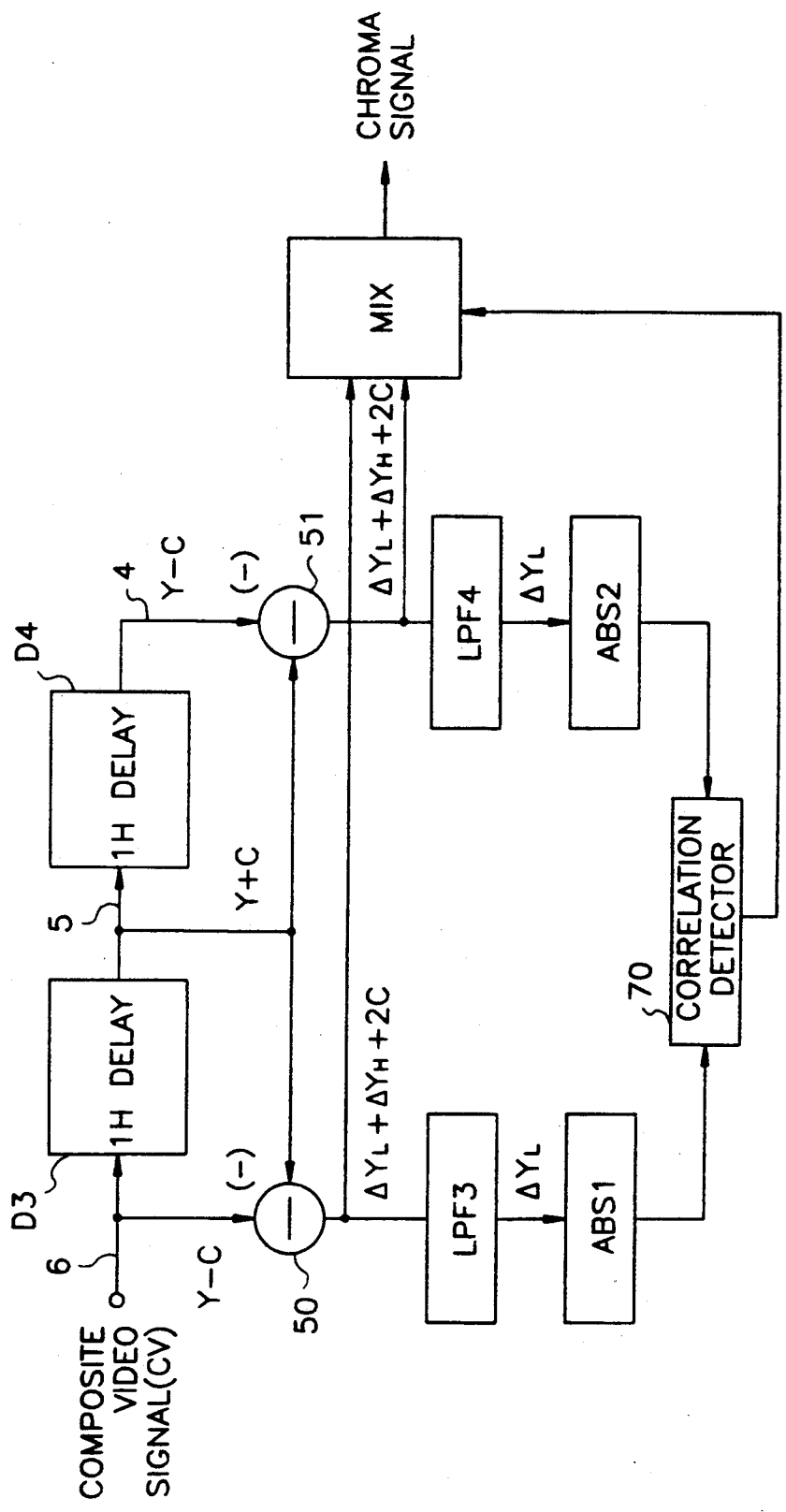
FIG. 6 is a block diagram of an adaptive 2H comb filter utilized in the prior art for separating the luminance and chrominance signals from a composite video signal.
Figure 7:
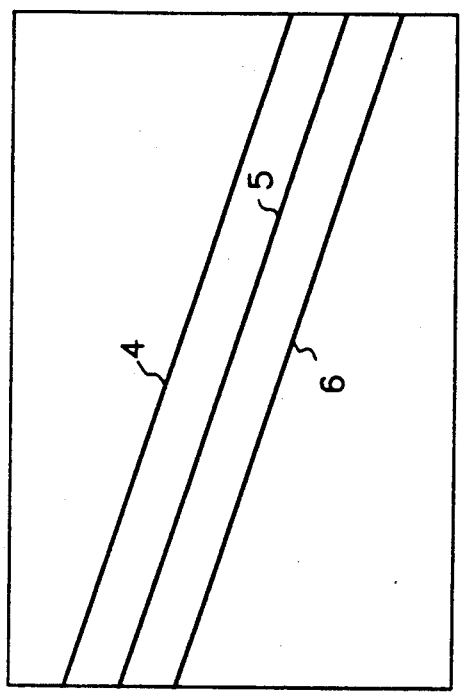

FIG. 3 shows a detailed drawing of the coefficient generator 70 in FIG. 1. This comprises the third to sixth inverters INV3 to INV6 for inverting and outputting the first to fourth correlation control signals W,X,Y and Z;

a first AND gate G5 for logically combining the first correlation control signal W with the output $\overline{X}$ of the fourth inverter INV4;

a second AND gate G6 for logically combining first correlation control signal W with the third correlation control signal Y;

a third AND gate G7 for logically combining the first correlation control signal $\overline{Y}$ with the output Z of the sixth inverter INV6;

a fourth AND gate G8 for logically combining the second correlation control signal X with the fourth correlation control signal Z;

a fifth OR gate G9 for logically combining the outputs of the first to third AND gates G5 to G7, and outputting a most significant bit MSB of a detection coefficient of the correlation;

a sixth OR gate G10 for logically combining the output of the fourth AND gate G8 with the output W and Y of the third and fourth inverters and outputting a least significant bit LSB of a detection coefficient of the correlation.

The present invention will be described below in detail based on the aforesaid constitution.

Referring to FIG. 1, the difference components between lines 2 and 1, and lines 2 and 3 provide $\Delta Y_L + \Delta Y_H + 2C$ at the first and second subtractor 10 and 40, respectively, and the sum motion components provide $2Y_L + 2Y_H + \Delta C$ at the first and second adder 20 and 30, respectively.

If the difference components are low pass filtered at the first and second low pass filters LPF1 and LPF2, respectively, $\Delta Y_L$ component is detected in each of the low pass filters LPF1 and LPF2 and therefore, each of the detected $\Delta Y_L$ component is inputted to the correlation detector 60 with the absolute value. Also, if the sum motion components are band pass filtered at the second and third band pass filters BPF2 and BPF3, respectively, $\Delta C$ is detected in each of the band pass filters BPF2 and BPF3 and therefore, each of the detected $\Delta C$ component is input to the correlation detector 60 with the absolute value in the same manner of $\Delta Y$. As described above, each of the detected signals A, B, C and D input to the correlation detector 60 generates each of the control signal for $\Delta Y_L$ and $\Delta C$ correlation through a predetermined processing procedure.

First, referring to FIG. 2 showing a detailed circuit diagram of the correlation detector 60 the second multiplexer MUX2 receives the $\Delta Y_L$ signals A and D through two input terminals and detects the smaller signal among the two input signals. Here, the second multiplexer MUX2 is operated by the control signal of the first comparator COM1, and the first comparator COM1 also receives and compares $\Delta Y_L$ signals A and D and output from the first low pass filter LPF1, and the second low pass filter LPF2, respectively, and outputs the compared result.

Namely, if the first low pass filtered $\Delta Y_L$ signal A is larger than the second low pass filtered $\Delta Y_L$ signal D, "1" is output. Therefore, the smaller signal detected in the second multiplexer MUX2 is input to one terminal of the second comparator COM2 and is compared with a predetermined first reference value Ref1 input to the other terminal of the second comparator COM2 As a result, if the smaller value detected in the second multiplexer MUX2 is smaller than the first reference value Ref1, the second comparator COM2 outputs "0" and if the former is larger than the latter the second comparator COM2 outputs "1".

The output of the second comparator COM2 is input to one terminal of each of the first and second OR gates G1 and G2, and the output of the first comparator COM1 is input to the other terminal of the first OR gate G1, and the inverted output of the first comparator COM1 through the first inverter INV1 is input to the other terminal of the second OR gate G2. Therefore, each of the two OR gates G1 and G2 combines logically the input signals, respectively, and as a result, the first and second correlation control signals W and X are output.

Also, $\Delta c$ signals B and C are applied to two input terminals of the third multiplexer MUX3. The third and fourth correlation control signals Y and Z are generated by two OR gates G3 and G4, respectively of which the input terminals are connected to the output terminals of a third comparator COM3, a fourth comparator COM4 and a second inverter INV2, in the same manner of $\Delta Y_L$ signals which are described above.

The first to fourth correlation control signals (W,X,Y,Z) generated by the procedure described above are input to the coefficient generator 70 and generate the detection coefficient of the correlation.

That is, as shown in FIG. 3, the first correlation control signal W and the inverting signal $\overline{X}$ of the second correlation control signal X output from the fourth inverter INV4 are logically multiplied in the first AND gate G5. The first correlation control signal W and the third correlation control signal Y are logically multiplied in the second AND gate G6. The third correlation control signal Y and the inverting signal $\overline{Z}$ of the fourth correlation control signal Z output from the sixth inverter INV6 are logically multiplied in the third AND gate G7. Then, the outputs of the first to third AND gates G5 to G7 are logically summed in the fifth OR gate G9. The most significant bit MSB of the detection coefficient of the correlation is output from the fifth OR gate G9.

Also, the second correlation control signal X and the fourth correlation control signal Z are logically multiflied by the fourth AND gate G8. The output of the fourth AND gate G8, and the inverting signals $\overline{w}$ and $\overline{y}$ of the first and third correlation control signals (w, y) output from the third and fifth inverter INV3 and INV5 are logically summed in the sixth OR gate G10. The least significant bit LSB of the detection coefficient the correlation is output from the sixth OR gate G9. Therefore, the condition for generating the detection coefficient of the correlation in accordance with the first to fourth correlation control signals w,x,y and z is shown in Table 1.

TABLE 1

| wx | yz | | |
|----|----|----|----|
|    | 01 | 10 | 11 |
| 01 | 01 | 11 | 01 |
| 10 | 11 | 10 | 10 |
| 11 | 01 | 10 | 11 |

Here, wx is the control signal of $\Delta Y_L$, yz is the control signal of $\Delta c$, 01 represents combed processing with the line 3 in FIG. 1, 10 represents combed processing with the line 1, and 11 represents that there is no correlation there between.

Therefore, if the detection coefficient of the correlation is applied to the selecting terminal of the first multiplexer MUX1, the multiplexer MUX1 selects and outputs the output of the first band pass filter BPF1 when there is no correlation. The multiplexer MUX1 selects and outputs the signal output from the first subtractor 10 when the composite video signal is comb processed with the line 3 and selects and outputs the signal output from the second subtractor 40 when the composite video signal is comb processed with the line 1.

As described above, when the luminance and chrominance signals are separated, the similarity with the line above and the line below is detected. Then, the luminance signal and the chrominance signal are separated from the line having larger similarity thereby facilitating the more accurate filtering and thus the effect of the improvement for picture image quality is obtained.

What is claimed is:

1. A circuit for separating the luminance and chrominance signals from a composite video signal in a color video signal processing system, comprising:

first delay means for delaying a composite video signal over a predetermined time interval to provide a first delayed signal;

second delay means for delaying said first delayed signal at said predetermined time interval to provide a second delayed signal;

first subtractor means for subtracting said composite video signal from said first delayed signal to provide a first subtracted signal;

first adder means for adding said first delayed signal to said composite video signal to provide a first added signal;

second adder means for adding said first delayed signal to said second delayed signal to provide a second added signal;

second subtractor means for subtracting said second delayed signal from said first delayed signal to provide a second subtracted signal;

first filter means for filtering said first and second subtracted signals respectively over a first predetermined bandwidth to provide first and second luminance difference signals;

second filter means for filtering said first and second added signals respectively over a second predetermined bandwidth to provide first and second chrominance difference signals;

correlation detector means for detecting correlation of said first and second luminance difference signals and said first and second chrominance difference signals to generate a plurality of correlation control signals;

coefficient generator means for logically combining said plurality of correlation control signals to generate a correlation coefficient;

third filter means for filtering said first delay signal over a third predetermined bandwidth to provide an intermediate signal; and multiplexer means for receiving and for selectively transmitting one of said intermediate signal, and said first and second subtracted signals in accordance with said correlation coefficient.

2. The circuit as recited in claim 1, wherein said correlation detector means comprises:

first comparator means for comparing said first and second luminance difference signals to provide a first compared signal;

first multiplexer means for receiving said first and second luminance difference signals to selectively transmitting one of the received signals in response to said first compared signal;

second comparator means for comparing a transmitted signal from said first multiplexer means to a first reference value to provide a second compared signal;

first OR gating means for logically summing said second compared signal and said first compared signal to generate a first correlation control signal;

first inverter means for inverting said first compared signal to provide a first inverted signal;

second OR gating means for logically summing said second compared signal and said first inverted signal to generate a second correlation control signal;

third comparator means for comparing said first and second chrominance difference signals to provide a third compared signal;

second multiplexer means for receiving said first and second chrominance difference signals to selectively transmitting one of the received signals in response to said third compared signal;

fourth comparator means for comparing a transmitted signal from said second multiplexer means to a second reference value to provide a fourth compared signal;

third OR gating means for logically summing said fourth compared signal and said third compared signal to generate a third correlation control signal;

second inverter means for inverting said third compared signal to provide a second inverted signal; and fourth OR gating means for logically summing said fourth compared signal and said second inverted signal to generate a fourth correlation control signal.

3. The circuit as recited in claim 2, wherein said coefficient generator comprises:

means for inverting said first, second, third and fourth correlation control signals to provide inverted first, second, third and fourth correlation control signals;

fifth gating means for providing a first gated output signal by logically combining said first correlation control signal and said second inverted correlation control signal;

sixth gating means for providing a second gated output signal by logically combining said first correlation control signal and said third correlation control signal;

seventh gating means for providing a third gated output signal by logically combining said third correlation control signal and said fourth inverted correlation control signal;

eighth gating means for providing a fourth gated output signal by logically combining said second correlation control signal and said fourth correlation control signal;

ninth gating means for logically combining the first, second and third gated output signals to generate a most significant bit of a correlation detecting coefficient; and tenth gating means for logically combining the fourth gated output signal and said inverted first and third correlation control signals to generate a least significant bit of a correlation detecting coefficient.

4. A circuit for separating the luminance and chrominance signals from a composite video signal in a color video signal processing system, comprising:

first delay means for providing a first delayed signal by delaying an input composite video signal by a predetermined time interval;

second delay means for providing a second delayed signal by delaying said first delayed signal by said predetermined time interval;

subtractor means for providing differences of said input composite video signal after each delay by subtracting each input composite video signal from a subsequent output composite video signal;

adder means for providing summations of said input composite video signal after each delay by adding said input composite video signal and said subsequent output composite video signal;

low-pass filter means for providing a plurality of luminance difference signals from said input composite video signal by low-pass filtering the differences of said input composite video signal after each delay;

band-pass filter means for providing a plurality of chrominance difference signals from said input composite video signal by band-pass filtering the summations of said input composite video signal after each delay;

means for detecting correlations of said plurality of luminance difference signals and said plurality of chrominance difference signals, and for generating a correlation coefficient;

filter means for providing a filtered signal by filtering the output of said first delay means; and multiplexer means for receiving the filtered signal and the differences of said input composite video signal after each delay, and selectively transmitting one of said filtered signal and the differences of said input composite video signal in accordance with said correlation coefficient.

5. The circuit as recited in claim 4, wherein:

said adder means comprises:
a first adder for adding the output of said first delay means to said input composite video signal;
a second adder for adding the outputs of said first delay means and second delay means;

said subtractor means comprises:
a first subtractor for subtracting said input composite video signal from the output of said first delay means; and
a second subtractor for subtracting the output of said second delay means from the output of said first delay means;

said low-pass filtering means comprises:
first and second low-pass filters for low-pass filtering the outputs of said first and second subtractors respectively; and said band-pass filtering means comprises:
first and second band-pass filters for filtering the outputs of said first and second adders.

6. The circuit as recited in claim 5, wherein said means for detecting correlations of said plurality of luminance signals and said plurality of chrominance difference signals comprises:

first comparator means for comparing the output of said first low-pass filter to the output of the second low-pass filter to provide a first compared signal, first multiplexer means for selectively transmitting a selected one of the output of said first low-pass filter and the output of said second low-pass filter in response to said first compared signal;

second comparator means for comparing a transmitted signal from said first multiplexer means to a predetermined first reference value to provide a second compared signal;

first gating means for logically summing said second compared signal and said first compared signal to generate a first correlation control signal;

first inverter means for inverting said first compared signal to provide a first inverted signal;

second gating means for logically summing said second compared signal and said first inverted signal to generate a second correlation control signal;

third comparator means for comparing the output of said first band-pass filter to the output of said second band pass filter to provide a third compared signal;

second multiplexer means for selectively transmitting one of the output of said first band-pass filter and the output of said second band-pass filter in response to said third compared signal;

fourth comparator means for comparing the transmitted signal from said second multiplexer means to a predetermined second reference value to provide a fourth compared signal;

third gating means for logically summing said fourth compared signal and said third compared signal to generate a third correlation control signal;

second inverter means for inverting said third compared signal to provide a second inverted signal; and fourth gating means for logically summing said fourth compared signal and said second inverted signal to generate a fourth correlation control signal.

7. The circuit as recited in claim 6, wherein said means for generating a correlation coefficient comprises:

means for inverting said first, second, third and fourth correlation control signals to provide respective first, second, third and fourth inverted control signals;

fifth gating means for providing a first gated output signal by logically combining said first correlation control signal and said second inverted control signal;

sixth gating means for providing a second gated output signal by logically combining said first correlation control signal and said third correlation control signal;

seventh gating means for providing a third gated output signal by logically combining said third correlation control signal and said fourth inverted control signal;

eight gating means for providing a fourth gated output signal by logically combining said second correlation control signal and said fourth correlation control signal;

ninth gating means for logically combining the first, second and third gated output signals to generate a most significant bit of a correlation coefficient; and tenth gating means for logically combining the fourth gated output signal and said inverted first and third control signals to generate a least significant bit of a correlation coefficient.

8. A method for separating the luminance and chrominance signals from a composite video signal in a color video signal processing system, comprising the steps of:

delaying an input composite video signal by one horizontal line to provide a first delayed signal;

delaying said first delayed signal by one horizontal line to provide a second delayed signal;

subtracting said first delayed signal from said input composite video signal and subtracting said second delayed signal from said first delayed signal to respectively provide first and second line difference signals;

adding said first delayed signal to said input composite video signal and adding said second delayed signal to said first delayed signal to respectively provide first and second line summation signals;

low-pass filtering said first and second line difference signals to provide first and second luminance difference signals;

band-pass filtering said first and second line summation signals to provide first and second chrominance difference signals;

detecting correlations of said first and second luminance difference signals, and said first and second chrominance difference signals, to provide a plurality of correlation control signals;

generating a correlation coefficient in response to said plurality of correlation control signals;

band-pass filtering said first delayed signal to provide a chrominance signal; and selecting one of said chrominance signal and said first and second line difference signals in response to said correlation coefficient.

9. A method for separating the luminance and chrominance signals as recited in claim 8, wherein said step of detecting correlations comprises of steps:

comparing said first and second line difference signals to provide a first control signal, and said first and second line summation signals to provide a second control signal;

selecting said first and second line difference signals in response to said first control signal to provide a first selected signal, and said first and second line summation signals in response to said second control signal to provide a second selected signal;

comparing said first selected signal to a first reference signal to provide a third control signal, and comparing said second selected signal to a second reference signal to provide a fourth control signal;

inverting said first control signal to provide a first inverted signal, and said second control signal to provide a second inverted signal; and OR gating said third control signal with said first control signal to provide a first correlation control signal, said third control signal with said first inverted control signal to provide a second correlation control signal, said fourth control signal with said second control signal to provide a third correlation control signal, and said fourth control signal with said second inverted control signal to provide a fourth correlation control signal.

10. A method for separating the luminance and chrominance signals as recited in claim 9, wherein said step of generating a correlation coefficient comprises:

inverting said first, second, third and fourth correlation control signals to provide first, second, third and fourth inverted correlation control signals;

AND gating said first correlation control signal with said second inverted correlation signal to provide a first intermediate signal, AND gating said first correlation control signal with said third correlation control signal to provide a second intermediate signal, and AND gating said third correlation control signal with said fourth inverted correlation signal to provide a third intermediate signal;

OR gating said first, second and third intermediate signals to provide a most significant bit of a correlation coefficient;

AND gating said fourth correlation control signal and said second correlation control signal to provide a fourth intermediate signal; and OR gating said first inverted correlation signal, said third inverted correlation signal and said fourth intermediate signal to provide a least significant bit of said correlation coefficient.

11. A method for separating the luminance and chrominance signals as recited in claim 8, wherein said step of detecting correlations comprises:

comparing said first and second line difference signals to provide a first control signal, and said first and second line summation signals to provide a second control signal;

selecting said first and second line difference signals in response to said first control signal to provide a first selected signal, and said first and second line summation signals in response to said second control signal to provide a second selected signal;

comparing said first selected signal to a first reference signal to provide a third control signal, and comparing said second selected signal to a second reference signal to provide a fourth control signal;

inverting said first control and second signals to provide a first and second inverted control signals;

gating said third control signal with said first control signal and said first inverted control signal respectively to provide first and second correlation control signals; and gating said fourth control signal with said second control signal and said second inverted control signal respectively to provide third and fourth correlation control signals.

12. A method for separating the luminance and chrominance signals as recited in claim 9, wherein said step of generating a correlation coefficient comprises:

inverting said first, second, third and fourth correlation control signals to provide first, second, third and fourth inverted correlation control signals;

gating said first correlation control signal with said second inverted correlation control signal to provide a first intermediate signal, gating said first correlation control signal with said third correlation control signal to provide a second intermediate signal, and gating said third correlation control signal with said fourth inverted correlation signal to provide a third intermediate signal;

gating said first, second and third intermediate signals to provide a most significant bit of a correlation coefficient;

gating said fourth correlation control signal and said second correlation control signal to provide a fourth intermediate signal; and gating said first inverted correlation control signal, said third inverted correlation control signal and said fourth intermediate signal to provide a least significant bit of said correlation coefficient.

13. A method for separating the luminance and chrominance signals from a composite video signal in a color video signal processing system, comprising the steps of:

delaying an input composite video signal by one period to provide a first delayed signal;

delaying said first delayed signal by one period to provide a second delayed signal;

subtracting said first delayed signal from said input composite video signal and subtracting said second delayed signal from said first delayed signal to respectively provide first and second line difference signals;

adding said first delayed signal to said input composite video signal and adding said second delayed signal to said first delayed signal to provide first and second line summation signals;

filtering said first and second line difference signals to provide first and second luminance difference signals;

filtering said first and second line summation signals to provide first and second chrominance difference signals;

detecting correlations of said first and second luminance difference signals, and said first and second chrominance difference signals, to provide a plurality of correlation control signals;

generating a correlation coefficient in response to said plurality of correlation control signals;

filtering said first delayed signal to provide a chrominance signal; and selecting one of said chrominance signal and said first and second line difference signals in response to said correlation coefficient.

14. A method for separating the luminance and chrominance signals as recited in claim 13, wherein said step of detecting correlations comprises of steps:

comparing said first and second line difference signals to provide a first control signal, and said first and second line summation signals to provide a second control signal;

selecting said first and second line difference signals in response to said first control signal to provide a first selected signal, and said first and second line summation signals in response to said second control signal to provide a second selected signal;

comparing said first selected signal to a first reference signal to provide a third control signal, and comparing said second selected signal to a second reference signal to provide a fourth control signal;

inverting said first control signal and said second control signal to provide first and second inverted signals; and gating said third control signal with said first control signal to provide a first correlation control signal, said third control signal with said first inverted signal to provide a second correlation control signal, said fourth control signal with said second control signal to provide a third correlation control signal, and said fourth control signal with said second inverted signal to provide a fourth correlation control signal.

15. A method for separating the luminance and chrominance signals as recited in claim 13, wherein said step of generating a correlation coefficient comprises of steps of:

inverting said first, second, third and fourth correlation control signals to provide first, second, third and fourth inverted correlation control signals;

gating said first correlation control signal with said second inverted correlation control signal to provide a first intermediate signal, gating said first correlation control signal with said third correlation control signal to provide a second intermediate signal, and gating said third correlation control signal with said fourth inverted correlation control signal to provide a third intermediate signal;

gating said first, second and third intermediate signals to provide a most significant bit of a correlation coefficient;

gating said fourth correlation control signal and said second correlation control signal to provide a fourth intermediate signal; and gating said first inverted correlation control signal, said third inverted correlation control signal and said fourth intermediate signal to provide a least significant bit of said correlation coefficient.

* * * * *

UNITED STATES PATENT AND TRADEMARK OFFICE
CERTIFICATE OF CORRECTION

Page 1 of 2

PATENT NO. : 5,206,715
DATED : 27 April 1993
INVENTOR(S) : Jun-Mo Jung, et al.

It is certified that error appears in the above-indentified patent and that said Letters Patent is hereby corrected as shown below:

Claim 5, Column 9, Line 40 after "for" insert --generating a first added signal by--, delete "the output of";

Line 40-41, replace "delay means" with --delayed signal--;

Line 42, after "for" insert --generating a second added signal by--"

Line 42-43 replace "the outputs of said first delay means and second delay means" with --said first delayed signal and said second delayed signal--;

Line 45 after "for" insert --generating a first subtracted signal by--;

Line 46 delete "the output of";

Line 46-47 replace "delay means" with --delayed signal--;

Line 48 after "for" insert --generating a second subtracted signal by--;

Line 48-50 replace "the output of said second delay means from the output of said first delay means" with --said second delayed signal from said first delayed signal--;

UNITED STATES PATENT AND TRADEMARK OFFICE
CERTIFICATE OF CORRECTION

PATENT NO. : 5,206,715
DATED : 27 April 1993
INVENTOR(S) : Jun-Mo Jung, et al.

It is certified that error appears in the above-indentified patent and that said Letters Patent is hereby corrected as shown below:

Line 53 delete "the outputs of";

Line 53-54 change "subtractors" to --subtracted signal,--;

Line 56-57 delete "the outputs of", change "adders" to --added signal--;

Claim 11    Column 12, Line 29 delete "control", insert --control-- after "second";

Column 12, Line 30 delete "a":

Signed and Sealed this

First Day of April, 1997

Attest:

BRUCE LEHMAN

Attesting Officer

Commissioner of Patents and Trademarks